US012586697B2

(12) United States Patent
Furuya et al.

(10) Patent No.: US 12,586,697 B2
(45) Date of Patent: Mar. 24, 2026

(54) GROMMET UNIT AND WATERPROOF STRUCTURE

(71) Applicants: TOYOTA JIDOSHA KABUSHIKI KAISHA, Toyota (JP); SUMITOMO WIRING SYSTEMS, LTD., Yokkaichi (JP)

(72) Inventors: Kentarou Furuya, Miyagi-ken (JP); Tomohiko Endo, Toyota (JP); Yusuke Tokuyama, Yokkaichi (JP); Takuya Murata, Yokkaichi (JP)

(73) Assignees: TOYOTA JIDOSHA KABUSHIKI KAISHA, Toyota (JP); SUMITOMO WIRING SYSTEMS, LTD., Yokkaichi (JP)

( * ) Notice: Subject to any disclaimer, the term of this patent is extended or adjusted under 35 U.S.C. 154(b) by 206 days.

(21) Appl. No.: 18/692,838

(22) PCT Filed: Sep. 12, 2022

(86) PCT No.: PCT/JP2022/034021
§ 371 (c)(1),
(2) Date: Mar. 18, 2024

(87) PCT Pub. No.: WO2023/047998
PCT Pub. Date: Mar. 30, 2023

(65) Prior Publication Data

US 2024/0387076 A1 Nov. 21, 2024

(30) Foreign Application Priority Data

Sep. 24, 2021 (JP) ................................ 2021-155995

(51) Int. Cl.
*H01B 17/58* (2006.01)

(52) U.S. Cl.
CPC ................................ *H01B 17/583* (2013.01)

(58) Field of Classification Search
CPC .............................. H01B 17/58; H01B 17/583
USPC ........................................................ 174/650
See application file for complete search history.

(56) References Cited

FOREIGN PATENT DOCUMENTS

| | | | |
|---|---|---|---|
| JP | 2007173139 | A | 7/2007 |
| JP | 2013031255 | A | 2/2013 |
| JP | 2020198699 | A | 12/2020 |

*Primary Examiner* — Tremesha W Burns

(57) ABSTRACT

A grommet unit according to one aspect of the present disclosure comprises a first grommet, a second grommet, a first bracket, and a second bracket. The first bracket is attached to a body panel so as to cover an opening. The first bracket has a first through-hole through which the first grommet is inserted and a second through-hole through which the second grommet is inserted. The second bracket is attached to the first bracket so as to cover the second through-hole. The second bracket has a third through-hole which is provided at a position that overlaps with the second through-hole and through which the second grommet is inserted.

10 Claims, 4 Drawing Sheets

GROMMET UNIT AND WATERPROOF STRUCTURE

BACKGROUND

Field of the Disclosure

The present disclosure relates to a grommet unit and a waterproof structure.

Related Art

Japanese Laid-Open Patent Publication No. 2007-173139 describes a grommet unit that covers an opening formed in the body panel of a vehicle. In Japanese Laid-Open Patent Publication No. 2007-173139, electric wires extend through the opening of the body panel. The grommet unit includes a grommet body made from a flexible material, such as rubber, and a bracket that fixes the grommet body to the body panel. The grommet body is sandwiched between the body panel and the bracket to seal the opening of the body panel through which the electric wires extend.

When assembling a wire harness including a grommet unit, such as that described above, and electric wires, first, necessary processes are performed such as the insertion of the electric wires through the grommet unit and then the attachment of terminals to the ends of the electric wires. Then, the electric wires are inserted into the opening of the body panel, and the grommet unit is fitted to the opening of the body panel. Thus, when retrofitting electric wires to the grommet unit, the electric wires and the grommet unit that have been coupled to the body panel have to be removed from the body panel to insert the retrofitted electric wires through the grommet unit. Such a task is impractical and results in complicated procedures.

Further, to perform the insertion of electric wires in separate coupling processes, additional holes are necessary. This requires space and a fastening point.

It is an objective of the present disclosure to provide a grommet unit and a waterproof structure that allow for simple coupling.

SUMMARY

A grommet unit through which a first electric wire and a second electric wire extending through an opening of an attachment subject are inserted is provided. The grommet unit is attached to the attachment subject to cover the opening. The grommet unit includes a flexible first grommet through which the first electric wire is inserted, a flexible second grommet through which the second electric wire is inserted, a first bracket having greater rigidity than the first grommet and the second grommet, and a second bracket having greater rigidity than the first grommet and the second grommet. The first bracket is attached to the attachment subject to cover the opening, the first bracket including a first through-hole into which the first grommet is inserted and a second through-hole into which the second grommet is inserted. The second bracket is attached to the first bracket to cover the second through-hole, the second bracket including a third through-hole into which the second grommet is inserted, the third through-hole overlapping the second through-hole.

A waterproof structure of the present disclosure includes an attachment subject including a single opening through which a first electric wire and a second electric wire are inserted, and the above grommet unit. The grommet unit is attached to the attachment subject to cover the single opening.

The grommet unit and the waterproof structure of the present disclosure allow for simple coupling.

DETAILED DESCRIPTION

Figure 1:
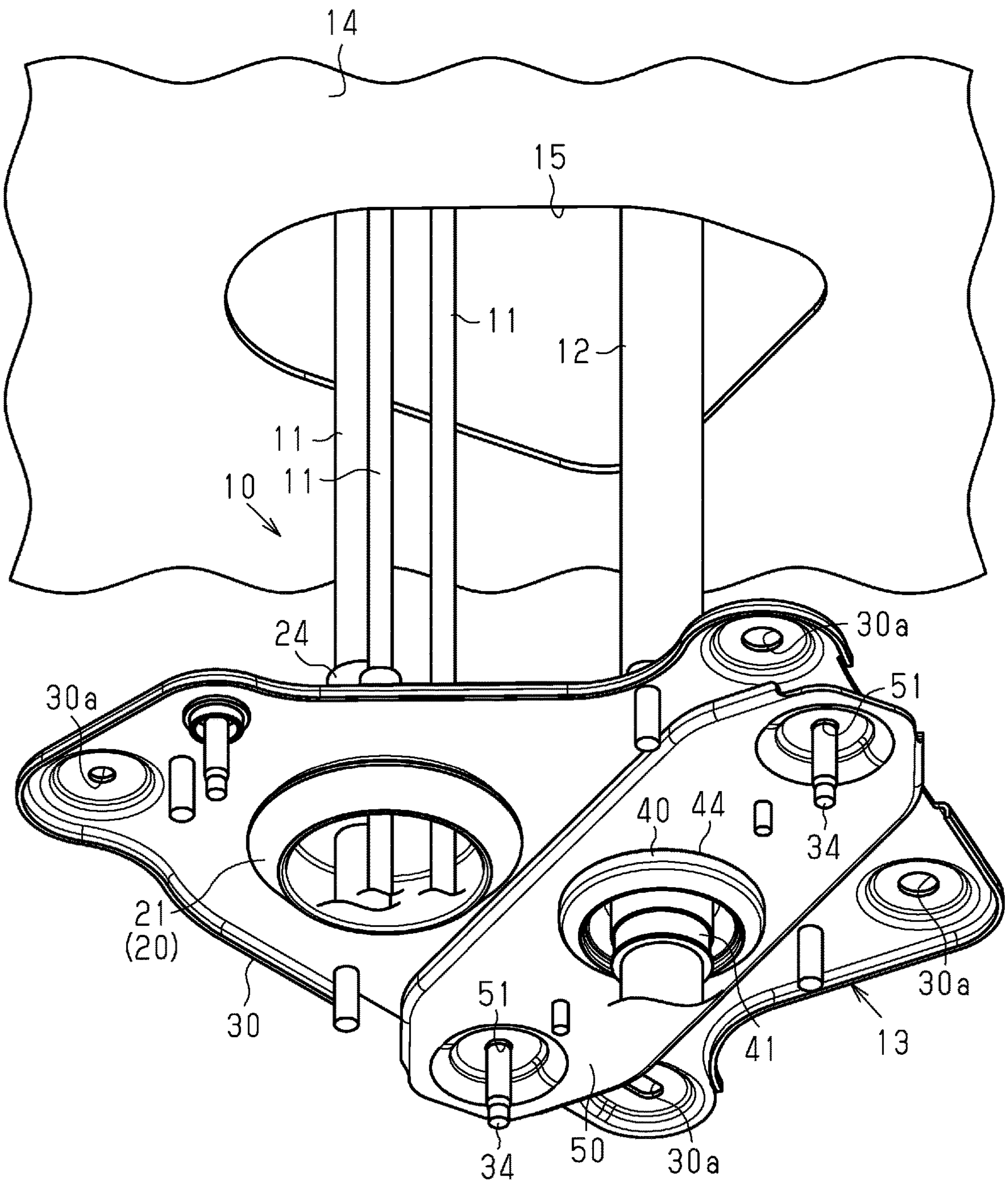
FIG. 1 is a perspective view of a grommet unit according to one embodiment.

Description of Embodiments of the Present Disclosure

First, the present disclosure according to an embodiment will now be described.

[1] A grommet unit of the present disclosure is a grommet unit through which a first electric wire and a second electric wire extending through an opening of an attachment subject are inserted. The grommet unit is attached to the attachment subject to cover the opening. The grommet unit includes a flexible first grommet through which the first electric wire is inserted, a flexible second grommet through which the second electric wire is inserted, a first bracket having greater rigidity than the first grommet and the second grommet, and a second bracket having greater rigidity than the first grommet and the second grommet. The first bracket is attached to the attachment subject to cover the opening, the first bracket including a first through-hole into which the first grommet is inserted and a second through-hole into which the second grommet is inserted. The second bracket is attached to the first bracket to cover the second through-hole, the second bracket including a third through-hole into which the second grommet is inserted, the third through-hole overlapping the second through-hole.

With this structure, an assembly component of the first electric wire, the first grommet, and the first bracket is attached to the attachment subject in advance, and then an assembly component of the second electric wire, the second grommet, and the second bracket can be retrofitted to the second through-hole of the first bracket. Thus, the grommet unit, through which plural electric wires are inserted, allows for simple coupling.

[2] The second bracket does not overlap the first through-hole as viewed in a direction in which the first electric wire is inserted With this structure, the second bracket will not interfere with the first electric wire and the first grommet, which are inserted into the first through-hole.

[3] The above grommet unit further includes a first sealing portion sandwiched between the attachment subject and the first bracket around the opening, and a second sealing portion sandwiched between the first bracket and the second bracket around the second through-hole.

With this structure, the first sealing portion, which is sandwiched between the attachment subject and the first bracket, seals the opening of the attachment subject. Further, the second sealing portion, which is sandwiched between the first bracket and the second bracket, seals the second through-hole.

[4] The first bracket includes a flat portion against which the second sealing portion is pressed.

With this structure, the entire periphery of the second sealing portion is sandwiched between the flat portion of the first bracket and the second bracket in a preferred manner. This will further allow the second sealing portion to be impervious to water.

[5] The first sealing portion is integrated with the first grommet.

With this structure, since the first sealing portion is integrated with the first grommet, the quantity of components is reduced.

[6] The first grommet includes a first tube that is tubular and inserted into the first through-hole, and a first flange that extends outward from the first tube, and the first flange includes the first sealing portion. With this structure, the first grommet integrates the first sealing portion, which is sandwiched between the attachment subject and the first bracket, with the first tube.

[7] The first flange includes a grommet through-hole overlapping the second through-hole and the third through-hole.

With this structure in which the first grommet includes the first flange including the first sealing portion, the assembly component of the second electric wire, the second grommet, and the second bracket is retrofitted to the second through-hole of the first bracket.

[8] The second sealing portion is integrated with the second grommet.

With this structure, since the second sealing portion is integrated with the second grommet, the quantity of components is reduced.

[9] The second grommet includes a second tube that is tubular and inserted into the third through-hole, and a second flange that extends outward from the second tube, and the second flange includes the second sealing portion. With this structure, the second grommet integrates the second sealing portion, which is sandwiched between the first bracket and the second bracket, with the second tube.

[10] A waterproof structure of the present disclosure includes the above grommet unit and an attachment subject including a single opening through which a first electric wire and a second electric wire are inserted. The grommet unit is attached to the attachment subject to cover the single opening.

With this structure, the waterproof structure that seals the opening of the attachment subject with the grommet unit will have the same advantages as the above grommet unit. With this waterproof structure, the attachment subject includes the single opening to which the grommet unit is attached and through which the first electric wire and the second electric wire are inserted. Thus, in the attachment subject, the waterproof structure S occupies less space.

Details of Embodiments of the Present Disclosure

A specific example of a grommet unit according to the present disclosure will now be described with reference to the drawings. In the drawings, structures may be partially exaggerated or simplified for sake of illustration convenience. In addition, elements in the figures have not been drawn to scale. The term tubular as used in the present specification includes a structure with a peripheral wall extending continuously formed in the entire circumferential direction in addition to a structure in which a number of components are joined to be tubular, and a structure that is partially cut away in the circumferential direction having a cutaway part in the circumferential direction to be C-shaped. A tubular shape also includes circular, elliptical, and polygonal shapes with acute or rounded corners.

As shown in FIG. 1, a wire harness 10 according to the present embodiment includes a first electric wire 11, a second electric wire 12, and a grommet unit 13. The grommet unit 13 is attached to a body panel 14 of a vehicle, which is an attachment subject. The grommet unit 13 is coupled to the body panel 14 so as to cover an opening 15 formed in the body panel 14. The grommet unit 13 and the body panel 14 form a waterproof structure S of the present embodiment. The first electric wires 11 and the second electric wire 12 are inserted through the grommet unit 13 and the opening 15 and laid out from one side of the body panel 14 to the other side. The body panel 14 includes, for example, a single opening 15 covered by the grommet unit 13.

In the present embodiment, plural first electric wires 11 are used. The first electric wires 11 include, for example, a high-voltage cable connected to a high-voltage battery. In the present embodiment, only one second electric wire 12 is used. The second electric wire 12 is, for example, a motor cable connected to a wheel-driving motor or the like.

Grommet Unit 13

Figure 2:
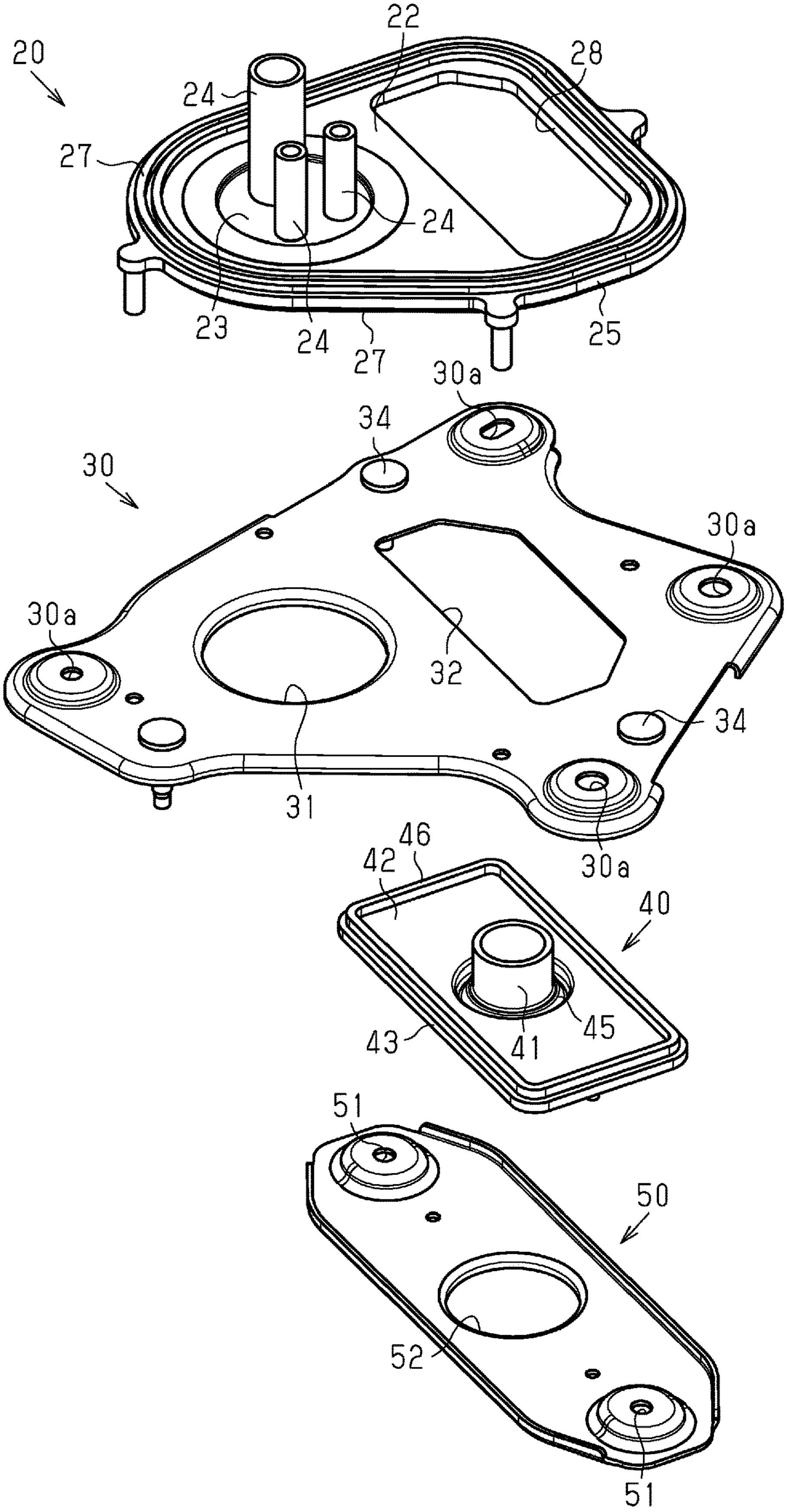
FIG. 2 is an exploded perspective view of the grommet unit according to the embodiment.

As shown in FIGS. 1 and 2, the grommet unit 13 includes a first grommet 20, a first bracket 30, a second grommet 40, and a second bracket 50. The first grommet 20, the first bracket 30, the second grommet 40, and the second bracket 50 are arranged one over another in this order in a direction extending away from the body panel 14.

The first grommet 20 is made from a flexible material. Examples of the material for the first grommet 20 include rubber, elastomer, and the like.

The second grommet 40 is made from a flexible material. Examples of the material for the second grommet 40 include rubber, elastomer, and the like. The second grommet 40 and the first grommet 20 may be made from the same material or different materials.

The first bracket 30 and the second bracket 50 are made from a material having greater rigidity than the first grommet 20 and the second grommet 40. The first bracket 30 and the second bracket 50 are flat members made from, for example, a metal material. The first bracket 30 and the second bracket 50 are pressed out of a metal plate.

Figure 3:
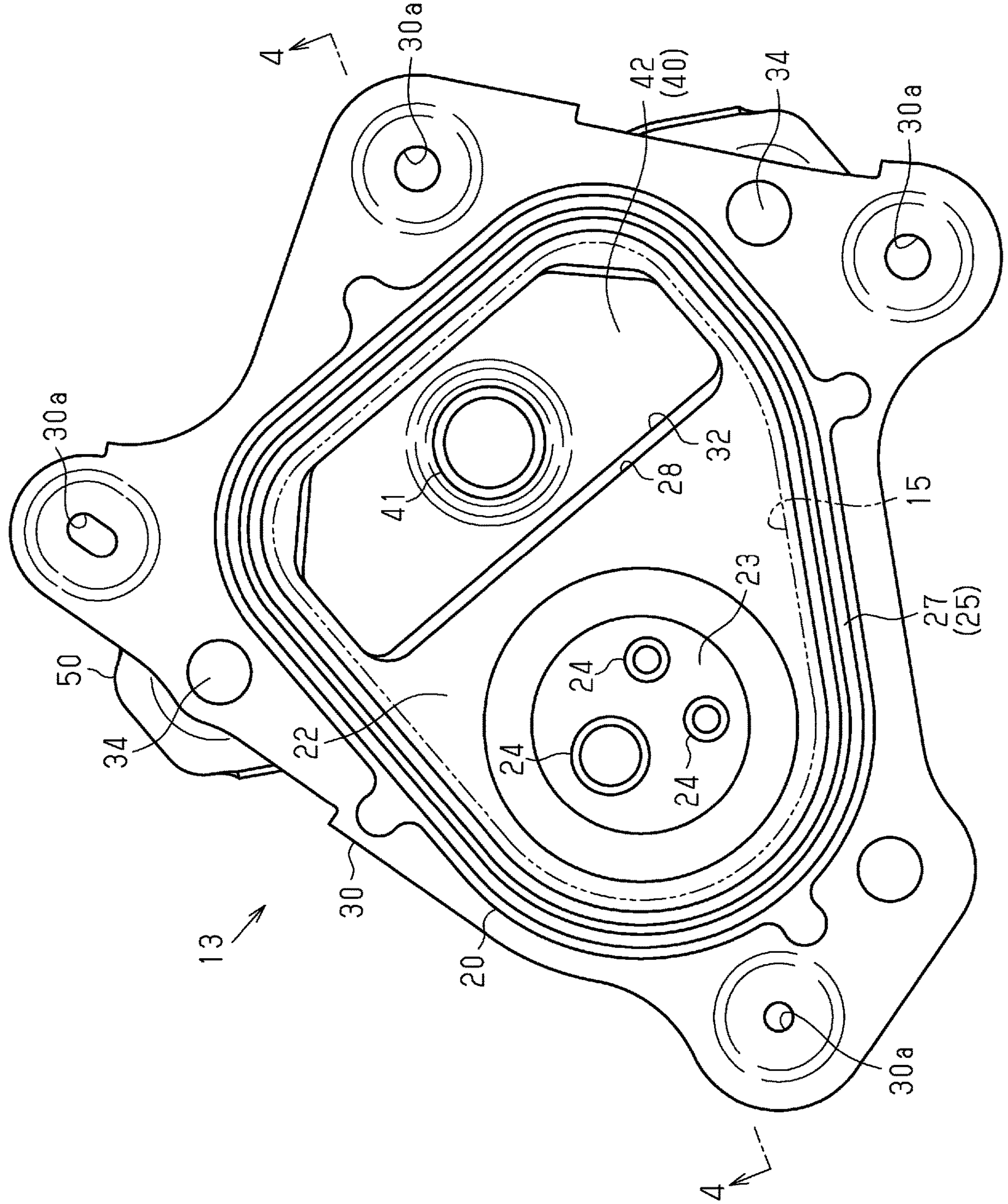
FIG. 3 is a plan view of the grommet according to the embodiment.
Figure 4:
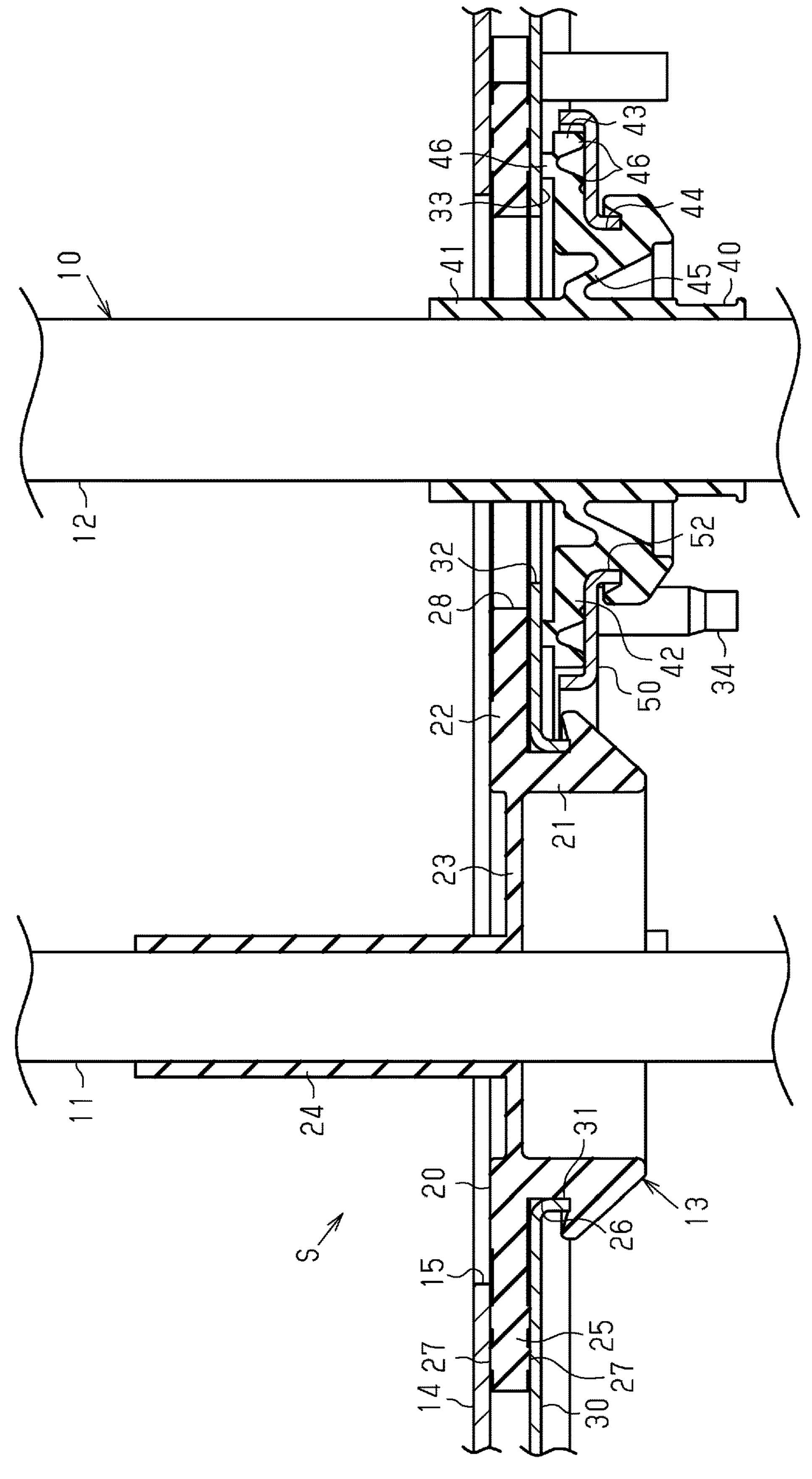
FIG. 4 is a cross-sectional view taken along line 4-4 in FIG. 3.

As shown in FIGS. 3 and 4, the first grommet 20 includes, for example, a first tube 21, which is tubular, and a first flange 22, which is integrated with the first tube 21 and which extends outward from the first tube 21.

The first tube 21 includes a closing portion 23 that closes the hollow part inside the first tube 21 and an electric wire insertion portion 24 that is tubular and extends from the closing portion 23. The first electric wire 11 extends in contact with the electric wire insertion portion 24. Thus, water will not pass through between the first electric wire 11 and the first tube 21. When plural first electric wires 11 are provided, plural electric wire insertion portions 24 are provided in correspondence with the first electric wires 11. The first electric wires 11 are inserted through the corresponding electric wire insertion portions 24.

The first flange 22, which is shaped to be larger than the opening 15 of the body panel 14, covers the opening 15. The first flange 22 includes an annular first sealing portion 25 extending along the edge defining the opening 15. The first sealing portion 25 is sandwiched between the surface of the body panel 14 and the first bracket 30 around the opening 15.

That is, the first sealing portion 25 is compressed between the body panel 14 and the first bracket 30 around the opening 15. Thus, the first sealing portion 25 seals the opening 15.

The first bracket 30 holds the first flange 22 with the body panel 14 and covers the opening 15. The first bracket 30 is fixed to the body panel 14 by bolts. The first bracket 30 includes bolt insertion holes 30*a*. Fixing bolts (not shown) extending from the body panel 14 are inserted into corresponding ones of the bolt insertion holes 30*a*.

As shown in FIGS. 2 and 4, the first bracket 30 includes a first through-hole 31 into which the first grommet 20 is inserted, and a second through-hole 32 into which the second grommet 40 is inserted.

The edge defining the first through-hole 31 is bent away from the first flange 22 in, for example, a burring process or the like. The first tube 21 of the first grommet 20 is inserted into the first through-hole 31. The first tube 21 includes an outer surface that includes a first fitting groove 26 into which the edge defining the first through-hole 31 is fitted. The edge defining the first through-hole 31 fitted into the first fitting groove 26 fixes the first grommet 20 in the first through-hole 31. The first electric wires 11 are inserted through the first through-holes 31 and the first tubes 21.

In the first grommet 20, the first sealing portion 25 includes first lips 27 that project from opposite surfaces of the first sealing portion 25. One of the first lips 27 contacts the surface of the body panel 14 around the opening 15. The other one of the first lips 27 contacts the surface of the first bracket 30. The first lips 27 are sandwiched and compressed between the body panel 14 and the first bracket 30 to seal the space between the body panel 14 and the first bracket 30 effectively.

The first flange 22 of the first grommet 20 includes a grommet through-hole 28. The grommet through-hole 28 overlaps the second through-hole 32 in the direction in which the second electric wire 12 is inserted.

The second grommet 40 is arranged between the first bracket 30 and the second bracket 50. The second grommet 40 includes, for example, a second tube 41, which is tubular, and a second flange 42, which is integrated with the second tube 41 and which extends outward from the second tube 41. The second electric wire 12 extends in contact with the second tube 41. Thus, water will not pass through between the second electric wire 12 and the second tube 41. The second tube 41 and the second electric wire 12 are inserted into the grommet through-hole 28 of the first grommet 20, the second through-hole 32 of the first bracket 30, and a third through-hole 52 of the second bracket 50, which will be described later.

The second flange 42, which is shaped to be larger than the second through-hole 32 of the first bracket 30, covers the second through-hole 32. The second flange 42 includes an annular second sealing portion 43 extending along the edge defining the second through-hole 32. The second sealing portion 43 is sandwiched between the first bracket 30 and the second bracket 50 around the second through-hole 32. That is, the second sealing portion 43 is compressed between the first bracket 30 and the second bracket 50 around the second through-hole 32. Thus, the second sealing portion 43 seals the second through-hole 32.

As shown in FIG. 4, the first bracket 30 also includes a flat portion 33 against which the second sealing portion 43 is pressed. The flat portion 33 includes, for example, a flat surface perpendicular to the direction in which the second through-hole 32 extends. The second sealing portion 43 partially overlaps the first sealing portion 25 as viewed in the direction in which the second through-hole 32 extends. This reduces the grommet unit 13 in size in a planar direction of the body panel 14.

The second bracket 50 holds the second flange 42 with the first bracket 30 and covers the second through-hole 32. The second bracket 50 is fixed to the first bracket 30 by bolts. As shown in FIG. 2, the second bracket 50 includes plural bolt insertion holes 51. Fixing bolts 34 extending from the first bracket 30 are inserted into corresponding bolt insertion holes 51. The second bracket 50 does not overlap the first through-hole 31 as viewed in the direction in which the first electric wire 11 is inserted.

As shown in FIGS. 2 and 4, the second bracket 50 includes a third through-hole 52 overlapping the second through-hole 32 of the first bracket 30 and the grommet through-hole 28 of the first grommet 20 in the direction in which the second electric wire 12 is inserted. The second electric wire 12 and the second tube 41 of the second grommet 40 are inserted into the third through-hole 52.

The edge defining the third through-hole 52 is bent away from the first bracket 30 in, for example, a burring process or the like. The second flange 42 of the second grommet 40 includes a second fitting groove 44 into which the edge defining the third through-hole 52 is fitted, and a connection portion 45 that connects the second fitting groove 44 to the outer surface of the second tube 41. The edge defining the third through-hole 52 fitted into the second fitting groove 44 fixes the second grommet 40 to the third through-hole 52. The connection portion 45 is thinner and more flexible than other portions of the second grommet 40. This further allows the second tube 41 to follow the second electric wire 12.

In the second grommet 40, the second sealing portion 43 includes second lips 46 that project from opposite surfaces of the second sealing portion 43. One of the second lips 46 contacts the surface of the first bracket 30 around the second through-hole 32. The other one of the second lips 46 contacts the surface of the second bracket 50. The second lips 46 are sandwiched and compressed between the first bracket 30 and the second bracket 50 to seal the space between the first bracket 30 and the second bracket 50 effectively.

An example of the procedures for assembling the wire harness 10 will now be described.

A first assembly component including the first electric wires 11, the first grommet 20, and the first bracket 30 is first formed. In this case, necessary processes are performed such as the insertion of the first electric wires 11 through the electric wire insertion portions 24 of the first grommet 20, and then the attachment of terminals (not shown) to the ends of the first electric wires 11. Further, the first tube 21 of the first grommet 20 is fitted into the first through-hole 31 of the first bracket 30 through which the first electric wires 11 are inserted. This completes the formation of the first assembly component including the first electric wires 11, the first grommet 20, and the first bracket 30.

Then, the first electric wires 11 of the first assembly component are inserted into the opening 15, and the first bracket 30 is fixed to the body panel 14 to cover the opening 15. Thus, the first sealing portion 25 is compressed between the body panel 14 and the first bracket 30.

Next, a second assembly component including the second electric wire 12, the second grommet 40, and the second bracket 50 is formed. In this case, necessary processes are performed such as the insertion of the second electric wire 12 through the second tube 41 of the second grommet 40 and the attachment of a terminal (not shown) to the end of the second electric wire 12. Further, the second fitting groove 44 of the second grommet 40 is fitted to the second bracket 50 in the third through-hole 52 through which the second electric wire 12 is inserted. This completes the formation of the second assembly component including the second electric wire 12, the second grommet 40, and the second bracket 50.

The second electric wire 12 of the second assembly component is inserted through the second through-hole 32 and the grommet through-hole 28 of the first assembly component, and the second bracket 50 is fixed to the first bracket 30 to cover the second through-hole 32. Thus, the second sealing portion 43 is compressed between the first bracket 30 and the second bracket 50. With the above structure, the grommet unit 13 will restrict the entry of water into the single opening 15 through which the first electric wires 11 and the second electric wire 12, which are assembled in separate processes, are inserted.

The advantages of the present embodiment will now be described.

(1) The first bracket 30 is attached to the body panel 14 to cover the opening 15. The first bracket 30 includes the first through-hole 31, into which the first grommet 20 is inserted, and the second through-hole 32, into which the second grommet 40 is inserted. The second bracket 50 is attached to the first bracket 30 to cover the second through-hole 32. The second bracket 50 includes the third through-hole 52, which overlaps the second through-hole 32 and receives the second grommet 40.

This structure allows for the assembly component of the second electric wire 12, the second grommet 40, and the second bracket 50 to be retrofitted to the second through-hole 32 of the first bracket 30, which was coupled to the body panel 14 in advance. Thus, the grommet unit 13, through which the first electric wires 11 and the second electric wire 12 are inserted, allows for simple coupling to the body panel 14.

(2) The second bracket 50 does not overlap the first through-hole 31 as viewed in the direction in which the first electric wire 11 is inserted. With this structure, the second bracket 50 will not interfere with the first electric wires 11 and the first grommet 20, which are inserted into the first through-hole 31.

(3) The grommet unit 13 includes the first sealing portion 25, which is sandwiched between the body panel 14 and the first bracket 30 around the opening 15, and the second sealing portion 43, which is sandwiched between the first bracket 30 and the second bracket 50 around the second through-hole 32.

With this structure, the first sealing portion 25, which is sandwiched between the body panel 14 and the first bracket 30, seals the opening 15 of the body panel 14. Further, the second sealing portion 43, which is sandwiched between the first bracket 30 and the second bracket 50, seals the second through-hole 32.

(4) The first bracket 30 includes the flat portion 33 against which the second sealing portion 43 is pressed.

With this structure, the entire periphery of the second sealing portion 43 is sandwiched between the flat portion 33 of the first bracket 30 and the second bracket 50 in a preferred manner. This will further allow the second sealing portion 43 to be impervious to water.

(5) The first sealing portion 25 is integrated with the first grommet 20.

With this structure, since the first sealing portion 25 is integrated with the first grommet 20, the quantity of components is reduced.

(6) The first grommet 20 includes the first tube 21, which is tubular and inserted into the first through-hole 31, and the first flange 22, which extends outward from the first tube 21. The first flange 22 includes the first sealing portion 25. With this structure, the first grommet 20 integrates the first sealing portion 25, which is sandwiched between the body panel 14 and the first bracket 30, with the first tube 21.

(7) The first flange 22 includes the grommet through-hole 28 overlapping the second through-hole 32 and the third through-hole 52.

With this structure in which the first grommet 20 includes the first flange 22 including the first sealing portion 25, the assembly component of the second electric wire 12, the second grommet 40, and the second bracket 50 is retrofitted to the second through-hole 32 of the first bracket 30.

(8) The second sealing portion 43 is integrated with the second grommet 40.

With this structure, since the second sealing portion 43 is integrated with the second grommet 40, the quantity of components is reduced.

(9) The second grommet 40 includes the second tube 41, which is tubular and inserted into the third through-hole 52, and the second flange 42, which extends outward from the second tube 41. The second flange 42 includes the second sealing portion 43. With this structure, the second grommet 40 integrates the second sealing portion 43, which is sandwiched between the first bracket 30 and the second bracket 50, with the second tube 41.

(10) The first bracket 30 is fixed to the body panel 14 by bolts. The second bracket 50 is fixed to the first bracket 30 by bolts.

With this structure, the first bracket 30 is more securely fixed to the body panel 14. Further, the second bracket 50 is more securely fixed to the first bracket 30.

(11) The waterproof structure S includes the grommet unit 13 and the body panel 14 including the single opening 15 through which the first electric wires 11 and the second electric wire 12 are inserted. The grommet unit 13 is attached to the body panel 14 to cover the single opening 15.

With this structure, the body panel 14 includes the single opening 15 to which the grommet unit 13 is attached and through which the first electric wires 11 and the second electric wire 12 are inserted. Thus, in the body panel 14, the waterproof structure S occupies less space.

In the present embodiment, the second tube 41 of the second grommet 40 is inserted into the second through-hole 32 of the first bracket 30. However, the second tube 41 does not need to be engaged with the edge defining the second through-hole 32. In the present embodiment, the second flange 42 of the second grommet 40 is not inserted into the second through-hole 32 of the first bracket 30. The second flange 42 may be inserted into the third through-hole 52 of the second bracket 50 and engaged with the edge defining the third through-hole 52.

In the present embodiment, as shown in FIG. 4, the first flange 22 of the first grommet 20 may project radially outward from the outer surface of the first tube 21. The electric wire insertion portion 24 may be a tube having a smaller diameter than the first tube 21 and continuous with the first tube 21. The closing portion 23 may be a diaphragm or a flexible plate extending between the radially inner surface of the first tube 21 and the radially outer surface of the electric wire insertion portion 24 to connect the first tube 21 and the wire insertion portion 24 in a closing manner.

In the present embodiment, the first fitting groove 26 may be arranged throughout the entire outer surface of the first tube 21. The first sealing portion 25 may be continuous along the entire outer edge of the first flange 22.

In the present embodiment, as shown in FIG. 4, the second flange 42 of the second grommet 40 may include a tubular part arranged to surround the outer surface of the second tube 41 and a flat part projecting radially outward from the outer surface of the tubular part. The connection portion 45 may be a diaphragm or a flexible plate extending between the radially inner surface of the tubular part of the second flange 42 and the radially outer surface of the second tube 41 to connect the tubular part of the second flange 42 and the second tube 41 in a closing manner.

In the present embodiment, the second fitting groove 44 may be arranged on the entire outer surface of the tubular part of the second flange 42. The second sealing portion 43 may be continuous at the entire outer edge of the flat part of the second flange 42.

The present embodiment may be modified as described below. The present embodiment and the following modifications can be combined as long as the combined modifications remain technically consistent with each other.

In the grommet unit 13 of the above embodiment, the first sealing portion 25 is integrated with the first grommet 20. Instead, the first sealing portion 25 may be separate from the first grommet 20 and arranged on the surface of the first bracket 30 that faces the body panel 14.

In the grommet unit 13 of the above embodiment, the second sealing portion 43 is integrated with the second grommet 40. Instead, the second sealing portion 43 may be separate from the second grommet 40 and arranged on the surface of the second bracket 50 that faces the first bracket 30.

In the above embodiment, the body panel 14 includes the single opening 15 through which the first electric wires 11 and the second electric wire 12 are inserted, and the grommet unit 13 covers the opening 15. Instead, for example, the body panel 14 may separately include a first opening through which the first electric wires 11 are inserted and a second opening through which the second electric wire 12 is inserted, and the grommet unit 13 may cover the separate first and second openings. This structure reduces the opening area of the body panel 14 and increases the rigidity of the body panel 14.

The first electric wires 11 and the second electric wire 12 are not limited in quantity and may differ from the above embodiment in accordance with the structure of the vehicle or the like.

The first grommet 20, the first bracket 30, the second grommet 40, and the second bracket 50 are not limited in structure, such as shape, and may differ from the above embodiment as long as the operation and advantages of the above embodiment can be obtained.

In the above embodiment, the present disclosure is applied to the grommet unit 13 coupled to the opening 15 of the body panel 14. Instead, the present disclosure may be applied to other grommet units.

The embodiment and modifications disclosed herein are examples in all respects, and the present invention is not limited to these examples. That is, the scope of the present invention is indicated by the claims, and is intended to include any equivalence to the claims and any modification that is within the scope of the claims.

REFERENCE SIGNS LIST

10) wire harness
11) first electric wire
12) second electric wire
13) grommet unit
14) body panel (attachment subject)
15) opening
20) first grommet
21) first tube
22) first flange
23) closing portion
24) electric wire insertion portion
25) first sealing portion
26) first fitting groove
27) first lip
28) grommet through-hole
30) first bracket
30*a*) bolt insertion hole
31) first through-hole
32) second through-hole
33) flat portion
34) fixing bolt
40) second grommet
41) second tube
42) second flange
43) second sealing portion
44) second fitting groove
45) connection portion
46) second lip
50) second bracket
51) bolt insertion hole
52) third through-hole
S) waterproof structure

The invention claimed is:

1. A grommet unit through which a first electric wire and a second electric wire extending through an opening of an attachment subject are inserted, the grommet unit being attached to the attachment subject to cover the opening, the grommet unit comprising:
- a flexible first grommet through which the first electric wire is inserted;
- a flexible second grommet through which the second electric wire is inserted;
- a first bracket having greater rigidity than the first grommet and the second grommet; and
- a second bracket having greater rigidity than the first grommet and the second grommet, wherein
- the first bracket is attached to the attachment subject to cover the opening, the first bracket including a first through-hole into which the first grommet is inserted and a second through-hole into which the second grommet is inserted, and
- the second bracket is attached to the first bracket to cover the second through-hole, the second bracket including a third through-hole into which the second grommet is inserted, the third through-hole overlapping the second through-hole.

2. The grommet unit according to claim 1, wherein the second bracket does not overlap the first through-hole as viewed in a direction in which the first electric wire is inserted.

3. The grommet unit according to claim 1, further comprising:
- a first sealing portion sandwiched between the attachment subject and the first bracket around the opening; and
- a second sealing portion sandwiched between the first bracket and the second bracket around the second through-hole.

4. The grommet unit according to claim 3, wherein the first bracket includes a flat portion against which the second sealing portion is pressed.

5. The grommet unit according to claim 3, wherein the first sealing portion is integrated with the first grommet.

6. The grommet unit according to claim 5, wherein the first grommet includes a first tube that is tubular and inserted into the first through-hole, and a first flange that extends outward from the first tube, and the first flange includes the first sealing portion.

7. The grommet unit according to claim 6, wherein the first flange includes a grommet through-hole overlapping the second through-hole and the third through-hole.

8. The grommet unit according to claim 3, wherein the second sealing portion is integrated with the second grommet.

9. The grommet unit according to claim 8, wherein the second grommet includes a second tube that is tubular and inserted into the third through-hole, and a second flange that extends outward from the second tube, and the second flange includes the second sealing portion.

10. A waterproof structure, comprising:

an attachment subject including a single opening through which a first electric wire and a second electric wire are inserted; and a grommet unit through which the first electric wire and the second electric wire extending through the single opening of the attachment subject are inserted, the grommet unit being attached to the attachment subject to cover the single opening, wherein the grommet unit comprising:

a flexible first grommet through which the first electric wire is inserted;

a flexible second grommet through which the second electric wire is inserted;

a first bracket having greater rigidity than the first grommet and the second grommet; and a second bracket having greater rigidity than the first grommet and the second grommet, wherein the first bracket is attached to the attachment subject to cover the single opening, the first bracket including a first through-hole into which the first grommet is inserted and a second through-hole into which the second grommet is inserted, and the second bracket is attached to the first bracket to cover the second through-hole, the second bracket including a third through-hole into which the second grommet is inserted, the third through-hole overlapping the second through-hole, the grommet unit is attached to the attachment subject to cover the single opening.

* * * * *